(12) United States Patent
Bery (10) Patent No.: US 11,950,573 B2
(45) Date of Patent: Apr. 9, 2024

(54) BIRD FEEDER WITH A PULL KNOB DEVICE FOR REMOVING THE BASE

(71) Applicant: KSP Inc, Noida (IN)

(72) Inventor: Puneet Bery, Noida (IN)

(73) Assignee: KSP INC, Noida (IN)

( * ) Notice: Subject to any disclaimer, the term of this patent is extended or adjusted under 35 U.S.C. 154(b) by 226 days.

(21) Appl. No.: 17/480,509

(22) Filed: Sep. 21, 2021

(65) Prior Publication Data

US 2023/0086625 A1   Mar. 23, 2023

(51) Int. Cl.
*A01K 39/01*   (2006.01)

(52) U.S. Cl.
CPC .................................... *A01K 39/01* (2013.01)

(58) Field of Classification Search
CPC .... A01K 39/01; A01K 39/0106; A01K 39/0113; Y10T 292/084; Y10T 292/0964; Y10T 403/599; Y10T 403/60; Y10T 403/602; Y10T 403/604; Y10S 292/37; B65D 43/26; B65D 55/10; B65D 55/12; B65D 2255/00
USPC ................................................. 220/323, 326
See application file for complete search history.

(56) References Cited

U.S. PATENT DOCUMENTS

| | | | |
|---|---|---|---|
| 5,829,382 A * | 11/1998 | Garrison | A01K 39/012 119/52.2 |
| 7,418,923 B1 * | 9/2008 | Banyas | A01K 39/0113 119/57.9 |
| 7,621,232 B2 | 11/2009 | Bescherer | |
| 8,485,130 B2 * | 7/2013 | Cote | A01K 39/012 119/57.8 |
| 9,277,735 B2 | 3/2016 | Murray | |
| 2015/0000602 A1 * | 1/2015 | Colvin | A01K 39/0106 119/51.01 |

* cited by examiner

*Primary Examiner* — Peter M Poon
*Assistant Examiner* — Kari A Bradberry
(74) *Attorney, Agent, or Firm* — Harness, Dickey & Pierce, P.L.C.

(57) ABSTRACT

A bird feeder including a removable base, which is configured to be easily removed from the body of the bird feeder by simply pulling the knob downwards to disengage the base from the main body of the enclosure, may be provided. An enclosure may include a top and bottom opening and a side wall. The bottom end of the enclosure may be enclosed by a base member including a pull knob device fixed inside the base member. The base member may be releasably secured to the enclosure by a pull knob mechanism. The base member can be easily removed using pull knob mechanism such that as the pull knob is pulled downwards by a user, locking pins engages a taper slider of the pull knob device and retracts horizontally in the inward direction.

6 Claims, 10 Drawing Sheets

BIRD FEEDER WITH A PULL KNOB DEVICE FOR REMOVING THE BASE

FIELD OF THE INVENTION

The present invention generally relates to bird feeders. More specifically, the present invention relates to bird feeders with a removable base wherein the base can be easily removed from the body of the bird feeder by simply pulling a knob attached to the base.

BACKGROUND OF THE RELATED ART

In the prior art, there are several birdfeeders which has a removable base. For example, U.S. Pat. No. 9,277,735 to Murray discloses a birdfeeder having a one-touch removable base portion and a stationary upper main body portion is provided. The one-touch removable base portion serves as the bottom of the birdfeeder and may have a generally circular housing wherein a spring tensioned pin moves from a closed First Position A to an open Second Position B within the circular housing of the base portion. The components of the one-touch removable base portion are protected from the outside elements by being located underneath the bottom of the birdfeeder. A first end of the movable pin extends outside the generally circular housing of the base portion and locks the removable base portion housing into the stationary upper main body portion of the birdfeeder. The birdfeeder further has a movable exterior guard which selectively either allows access to a feeding port or blocks access to the feeding port.

Further, U.S. Pat. No. 7,621,232 to Bescherer discloses a bird feeder has a tubular body member having an open bottom end. A base member interfittingly engages the bottom end of the tubular body member The base member is releasably secured to the tubular body member by the engagement of a spring-biased pin that communicates with an aperture through the wall of the tubular body member. Preferably, there are two spring-biased locking pins on opposing sides of the feeder with corresponding lock eye apertures. User manipulatable buttons, which are mechanically linked to the locking pins, are depressed to cause the locking pins to retract to permit releasable attachment of the tubular body member of the feeder thereon enabling easy access to the interior of the feeder.

There is a need for a bird feeder to be able to be quickly and easily cleaned. There is a specific need for an easily removable base for easy access to the bottom of the feeder. The prior art provides for bird feeders that claims to provide for an easily removable base. However, the bird feeder that are available in prior art does not allow the base to be removed easily. For the removal of the base, a user must hold the bird feeder with both his or her hands and then disengage the base by pressing buttons provided on the base of the bird feeder and then rotating the base to separate it from the body of the bird feeder.

Therefore, there is a need for a bird feeder wherein the base can be removed easily by operation of one hand by simply pulling the base downwards.

SUMMARY OF THE INVENTION

The present invention provides a solution to the problems associated with prior art bird feeders. The bird feeder of the present invention includes a novel base with pull knob mechanism wherein the base is quickly and easily removable from the bottom of the main body of the feeder. In particular, in the present invention, the base can be removed by simply pulling the knob downwards that disengages the base from the main body of the enclosure.

More specifically, the present invention in an embodiment includes an enclosure having a top and bottom opening and a side wall, said enclosure comprising plurality of holes providing access to birds to the feed contained inside the enclosure. The top opening of the enclosure is secured with a top cover. There are present plurality of locking apertures near the bottom end of the enclosure in the side wall. The bottom opening of the enclosure is secured by a base member enclosing the bottom opening of the enclosure, wherein the base member is having a pull knob device fixed inside the base member and wherein the base member comprising plurality of locking apertures near the top of the base member. The pull knob device consists of a metallic housing having locking pins passing through a cylindrical passage attached on sides of the said housing. The pull knob device further comprises of a pull knob attached to a taper slider through a vertical pin. The pull knob device further comprises of plurality of first compressive springs for locking pins forming spring-biased locking pins to bias locking pins outwardly, wherein the spring-biased locking pins passing through the locking apertures of the base member configured and arranged to engage the aperture on the enclosure member to releasably secure the base member to the bottom opening of the enclosure. The pull knob device further comprises of a second compressive spring for the taper slider biasing the pull knob in release position, wherein the locking pins engage with the taper slider and retract inwardly as pull knob is pulled vertically downwards by a user to disengage the spring-biased locking pins from the locking aperture of the enclosure.

In another embodiment, the present invention provides for the bird feeder with a pull knob device for removing the base, wherein the enclosure and base member comprise of two locking apertures.

In still another embodiment, the present invention provides for the bird feeder with a pull knob device for removing the base, wherein pull knob device comprises two locking pins extending from the pull knob device.

In still another embodiment, the present invention provides for the bird feeder with a pull knob device for removing the base, wherein the pull knob comprises two first compressive springs for locking pins forming spring-biased locking pins.

In still another embodiment, the present invention provides for the bird feeder with a pull knob device for removing the base, wherein the pull knob device is fixed inside the base member by screws.

The main object of the present in invention is to provide for a bird feeder that has an easily removable base.

Another main object of the present in invention is to provide for a bird feeder that has an easily removable base with pull knob device wherein the base can be removed by simply pulling the knob downwards.

Another object of the present in invention is to provide for a bird feeder with a base that can be removed by one hand and without using tools by simply pulling the knob downwards.

Another object of the present invention is to provide for a bird feeder that is easy to clean and maintain.

BRIEF DESCRIPTION OF THE DRAWINGS

The various aspects, features, and advantages of the present invention will be more apparent from the following description taken in conjunction with the accompanying drawings, in which.

DESCRIPTION OF THE PREFERRED EMBODIMENT

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Figure 1:
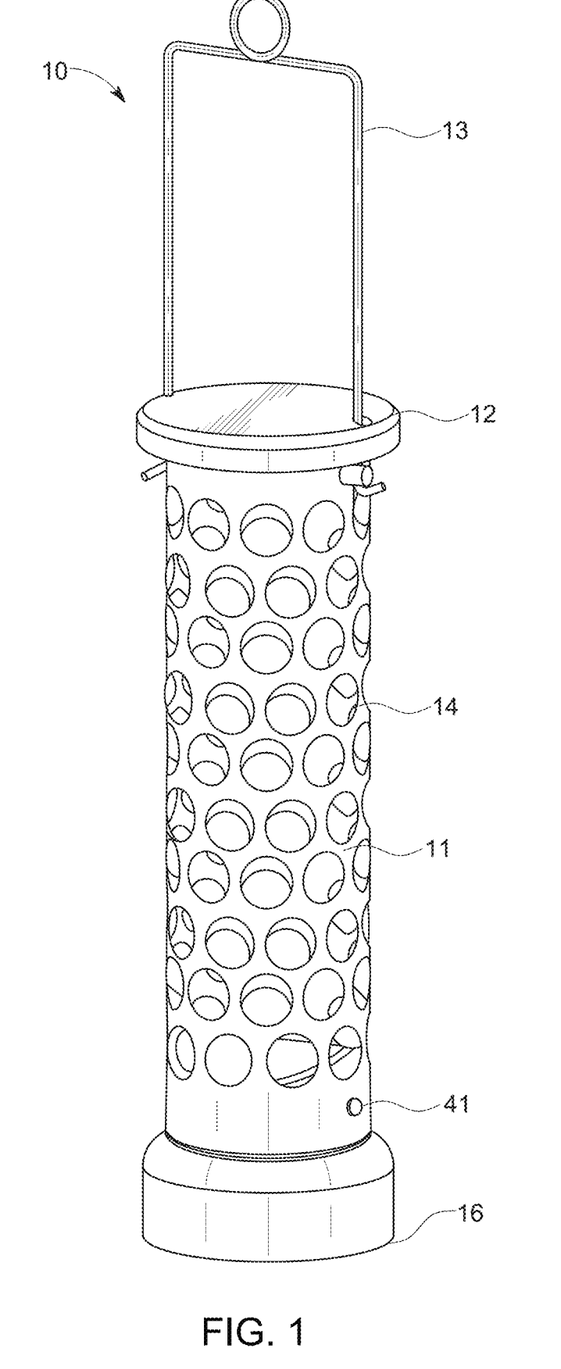
FIG. 1 is a perspective view of a bird feeder showing the preferred embodiment of the present invention.

In FIG. 1, a bird feeder (10) with a pull removable base shows the preferred embodiment of the present invention. The bird feeder (10) comprises of an enclosure (11) having top and bottom openings. The enclosure (11) is used to store food for birds. In the preferred embodiment, the shape of the enclosure is shown as cylindrical, however, the cross-section shape is not limited to the cylindrical shape. It can be other shapes, such as a square, octagonal, or triangular. The top opening of the enclosure (11) is secured with a top cover (12). The top cover (12) can be removed from the top end of the enclosure to refill the enclosure with the bird feed. The top cover (12) protects the bird feed in the enclosure (11) against rain and extraneous materials and also prevents the access of rodents to the bird feed contained in the enclosure (11). The enclosure (11) has attaching means near the top end for attaching handle or bail (13). The handle or bail (13) passes through the top cover and is used to suspend the enclosure for the bird feeder (11) from a tree, pole, house, or any other desired location.

The enclosure (11) for the bird feed around its body comprises of plurality of holes (14) which provide access to birds to the bird feed contained inside the enclosure (11).

The bottom end of the enclosure (11) is enclosed by a base member (16) which prevents the bird feed from draining out.

Figure 2:
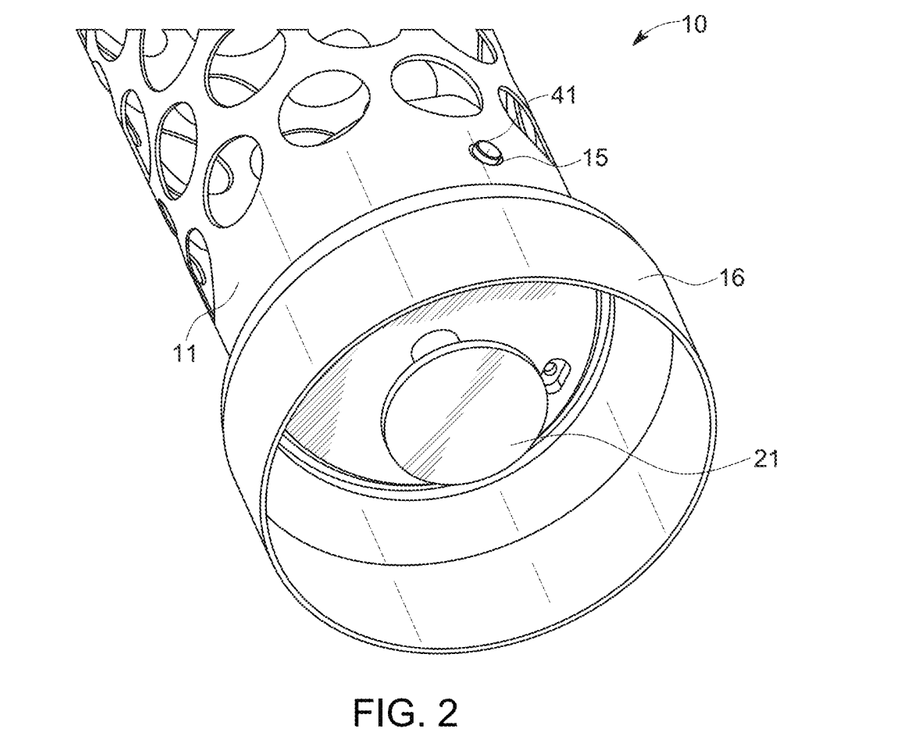
FIG. 2 is a close-up perspective view of the bird feeder showing base with pull knob fixed inside the base of the preferred embodiment of the present invention.

The base member (16) is made of metal. The base member (16) is releasably secured to the enclosure (11) by a pull knob mechanism. The base member (16) can be easily removed by using pull knob mechanism and the enclosure (11) can be easily cleaned and refilled. The detailed description of the base member and pull knob mechanism is given below. There is plurality of locking apertures (15) (as shown in FIG. 2) in the enclosure (11) near the bottom end. The locking apertures (15) are used for securing the base member (16) to the enclosure (11) by using pull knob mechanism, the details of which is given below.

In FIG. 2, the bird feeder (10) with removable base having a pull knob (21) at the bottom of the base member (16) is shown as per the preferred embodiment of the present invention. The base member (16) is releasably secured to the enclosure (11) by a pull knob mechanism as shown in FIG. 2. The knob (21) is fixed inside base member (16). As the knob (21) is pulled downwards by a user, the base member (16) separates from the enclosure (11). The detail of the pull knob mechanism is explained below.

Figure 3:
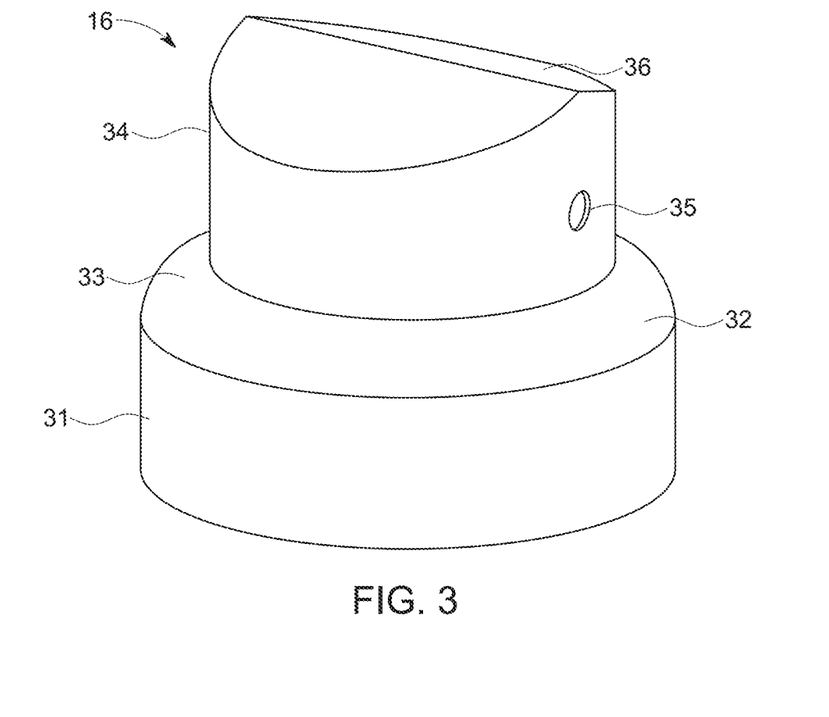
FIG. 3 is a close-up perspective view of the base of the bird feeder.

In FIG. 3, the construction of the base member (16) is explained. The base member (16) of the present invention has a foot portion (31). The foot portion (31) curves in a convex portion (32) to join an annular portion (33) of the base member (16). The annular portion (33) extends to join a neck portion (34). The neck portion (34) is inserted into the bottom end of the enclosure (11) and it fits snuggly into the bottom end of the enclosure (11). The neck portion (34) of the base member (16) on the outer surface has plurality of lock apertures (35). There are one or more locking pins (41) (shown in FIG. 1, FIG. 2, FIG. 4(b) and FIG. 5) extending from the pull knob device (not shown in FIG. 3 but shown in FIG. 4(b) and FIG. 5(b)) and retractably positioned through lock apertures (35) in the base member (16). The neck portion (34) extends to the portion called seed deflector (36) that deflects the bird feed towards the access points (shown by 14 in FIG. 1) for birds to feed on the same.

Figure 4A:
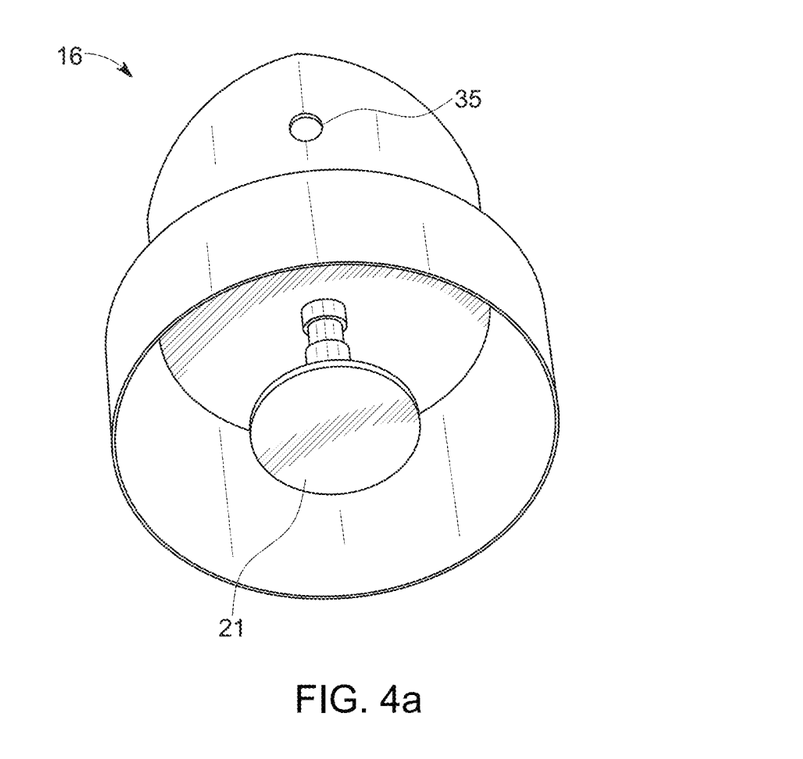
FIG. 4(a) is a close-up perspective view of the base of the bird feeder showing pull knob pulled vertically downwards.
Figure 4B:
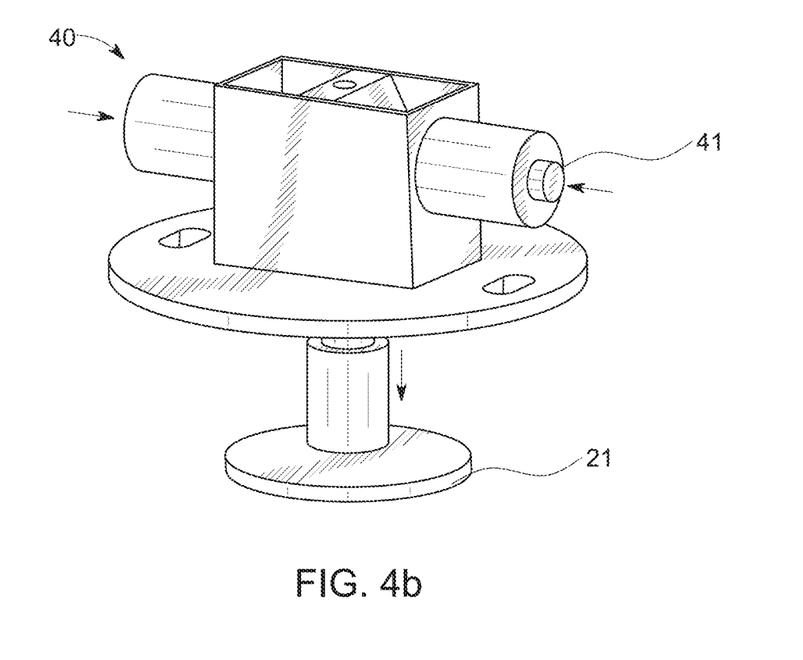
FIG. 4(b) is a close-up perspective view of pull knob pulled vertically downwards.

In FIGS. 4 and 5, the construction of the base member (16) and pull knob device is explained. FIG. 4(b) shows a pull knob device (40) wherein pull knob (21) having been pulled vertically downwards. In FIG. 4(a) the base member (16) of the bird feeder with pull knob device (40) (not shown completely in FIG. 4(a)) fixed inside it, is shown with pull knob (21) having been pulled vertically downwards. As the pull knob (21), is pulled vertically downwards, locking pins (41) retract horizontally in the inward direction through the lock aperture (15) of the enclosure (11) as well as through the lock aperture (35) of the base member causing the disengagement of the base member (16) from the enclosure (11) of the bird feeder (10). In the preferred embodiment, there are two locking pins. However, in another embodiment, there can be more than two locking pins.

Figure 5A:
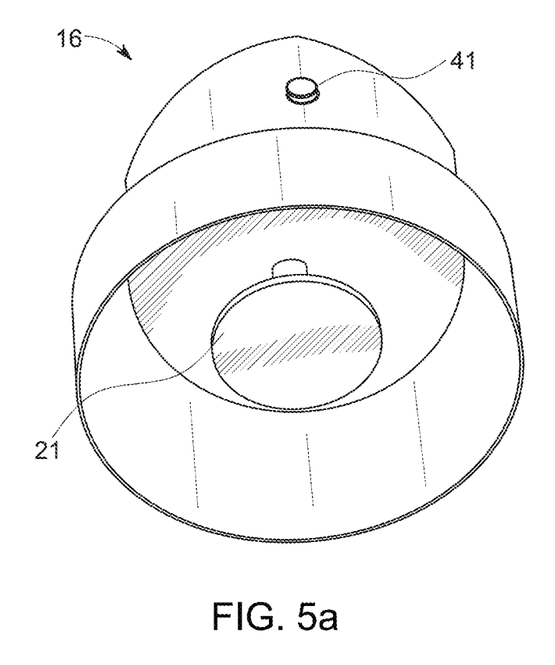
FIG. 5(a) is a close-up perspective view of the base of the bird feeder showing pull knob in release position.
Figure 5B:
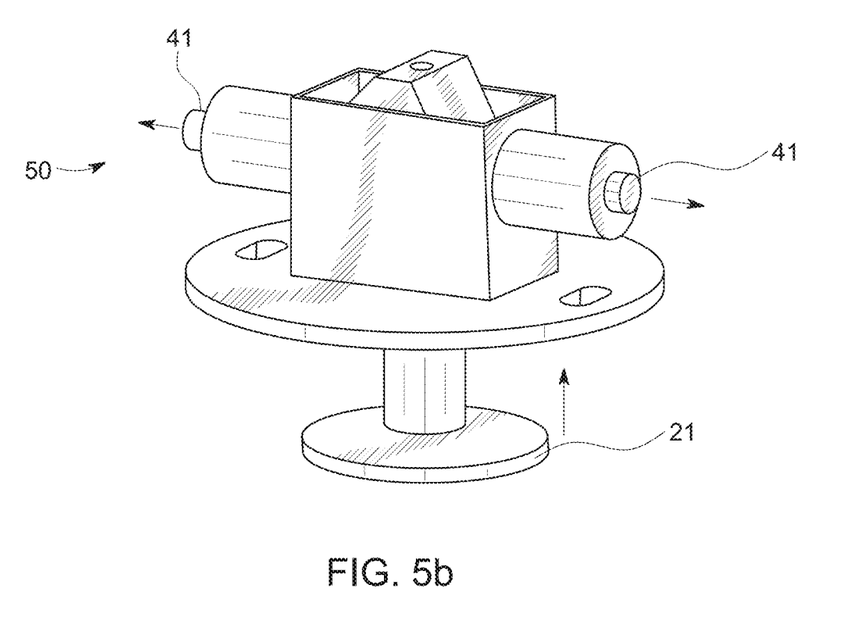
FIG. 5(b) is a close-up perspective view of pull knob in release position.

FIG. 5(b) shows a pull knob device (50) wherein pull knob (21) having been in release position. In FIG. 5(a) the base member (16) of the bird feeder with pull knob device (50) (not shown completely in FIG. 5(a)) fixed inside it, is shown with pull knob (21) having been in release position. As the pull knob (21) is released, the pull knob (21) moves in the upward direction to its original position, and the locking pins (41) retract horizontally in the outward direction to their original position through the lock aperture (15) of the enclosure (11) as well as through the lock aperture (35) of the base member securing the base member (16) to the enclosure (11) of the bird feeder (10).

Figure 6:
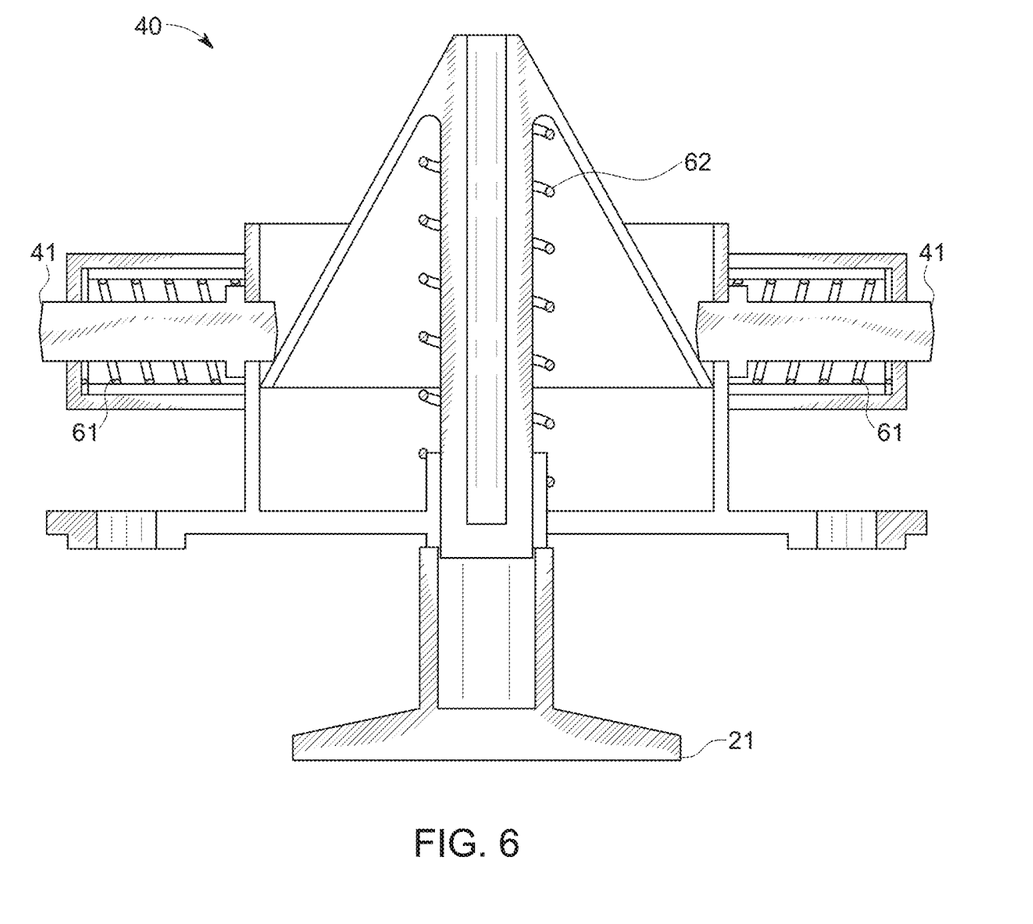
FIG. 6 is side cross-section view of pull knob in release position of FIG. 5(b)
Figure 7:
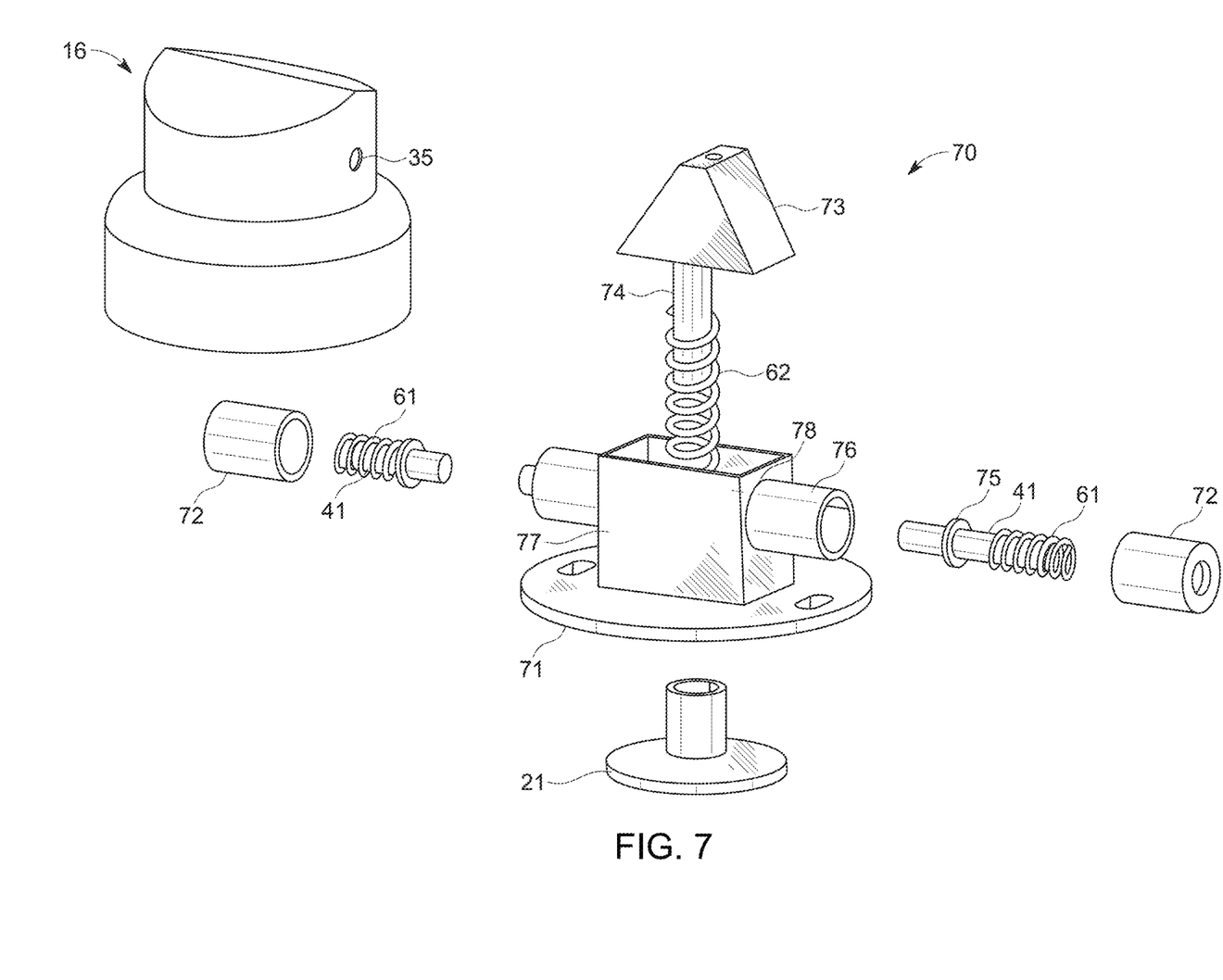
FIG. 7 shows an exploded view of pull knob device.

In FIG. 6 and FIG. 7, the side cross-section view of pull knob device in release position and an exploded view of pull knob device respectively of the preferred embodiment of the present invention is shown. As shown in FIG. 7 (and in FIG. 6), one locking pin (41) on either side of a metallic housing (77) passes through a cylindrical passage (76) attached on either side of the said housing (77). The housing (77) has one aperture (78) on either side through which locking pins (41) passes through. The cylindrical passage (76) on either side is attached around the aperture (78) in the housing (77). The locking pins (41) has a metal ring (75) at about two third length of the locking pins (41) from the proximal end. The proximal end is defined as the end of the locking pins (41) as seen from the side where locking pins engages with the enclosure (11) of the bird feeder (10). The metal ring (75) engages with the aperture (78) of the housing (77) and provides a barrier to the passage of locking pins (41) through aperture. A plurality of first compressive springs (61) for pin which forms spring biased locking pins (41) to bias the locking pins (41) outwardly. A cylindrical pin holder (72) with opening on either side covers the spring biased locking pins (41) on either side of the housing (77) and provides a passage for the horizontal movement of the locking pins (41). The cylindrical pin holder (72) is fixed inside the cylindrical passage (76).

Further, pull knob (21) is attached to a taper slider (73) through a vertical pin (74). Another spring which is a second compressive spring (62) for taper slider, biases the pull knob in release position. Inside the housing (77), the locking pins (41) engages with the taper slider (73).

Figure 8:
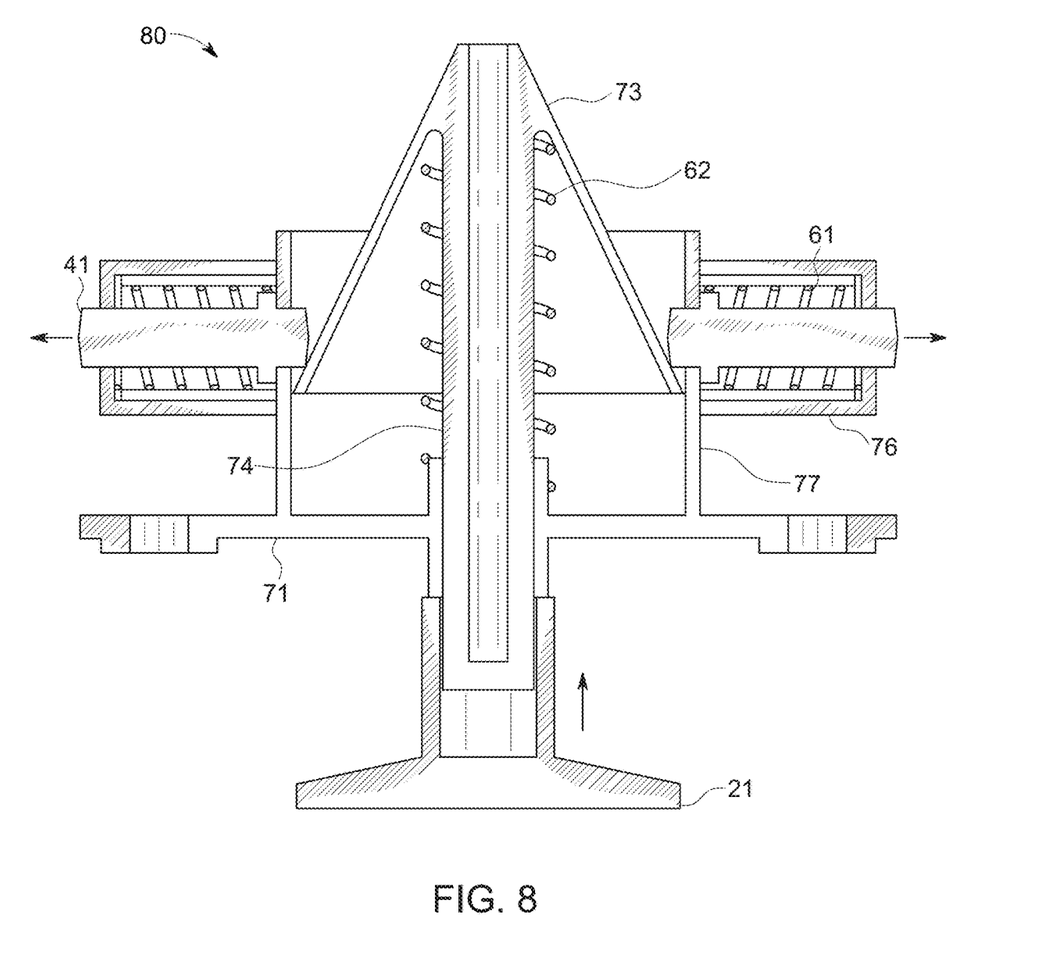
FIG. 8 shows the normal release position of pull knob device.

FIG. 8 shows the normal release position of pull knob device (80). In the normal release position, the locking pins (41) are retracted outward due to the compression in the first compressive springs (61) resulting from the engagement of the locking pins with the taper slider (73). As a result, the outwardly retracted locking pins (41) passes through the lock aperture (35) of the base member as well as aperture (15) of the enclosure (11) causing the engagement of the base member with the enclosure of the bird feeder.

Figure 9:
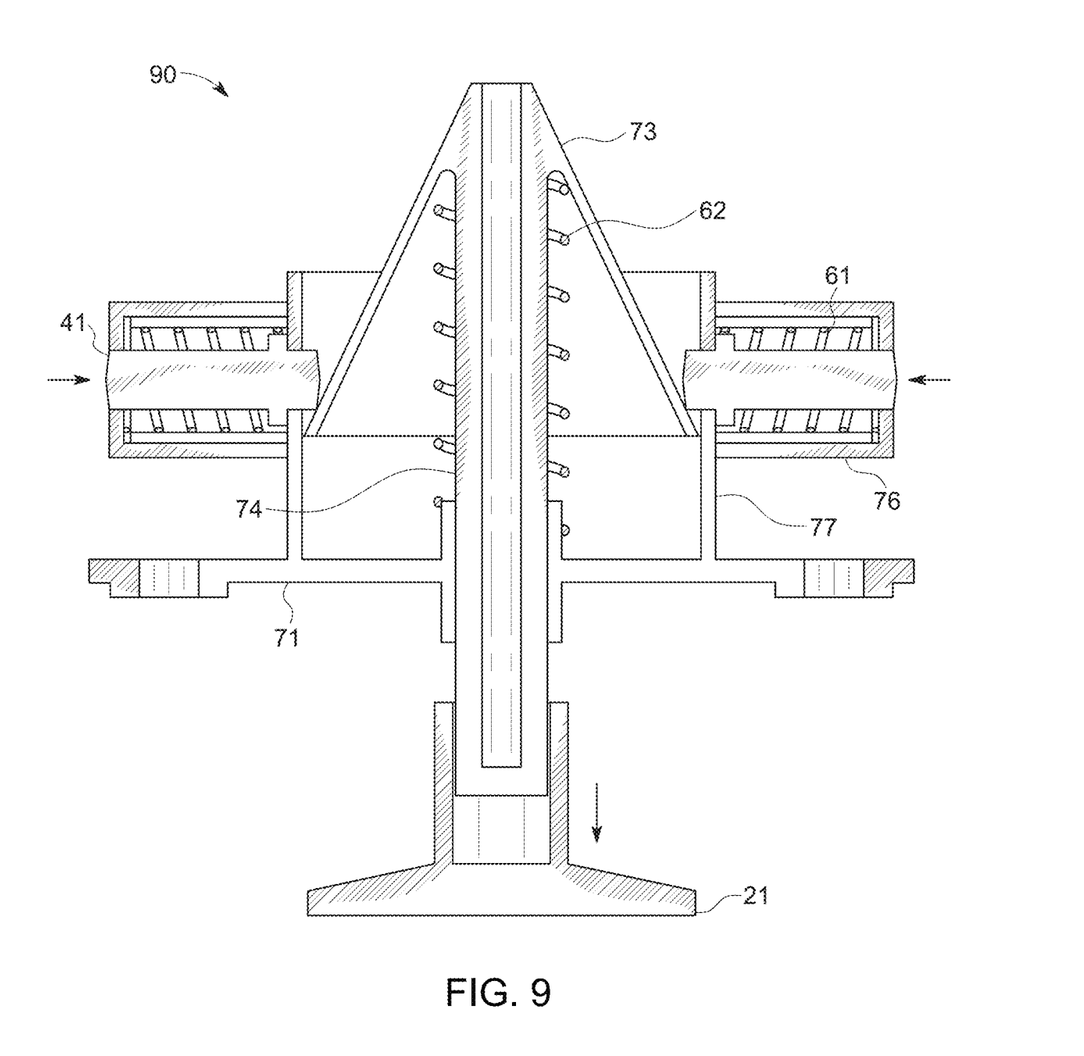
FIG. 9 shows the downward pulled position of pull knob device.

FIG. 9 shows the downward pulled position of pull knob device (90). As the pull knob (21), is pulled vertically downwards, the taper slider (73) moves downward and the locking pins (41) retract horizontally in the inward direction, due to tension in the first compressive springs (61) resulting from the engagement of the locking pins with the taper slider. The locking pins (41) retract horizontally in the inward direction through the lock aperture (15) of the enclosure (11) as well as through the lock aperture (35) of the base member causing the disengagement of the base member from the enclosure of the bird feeder.

Figure 10:
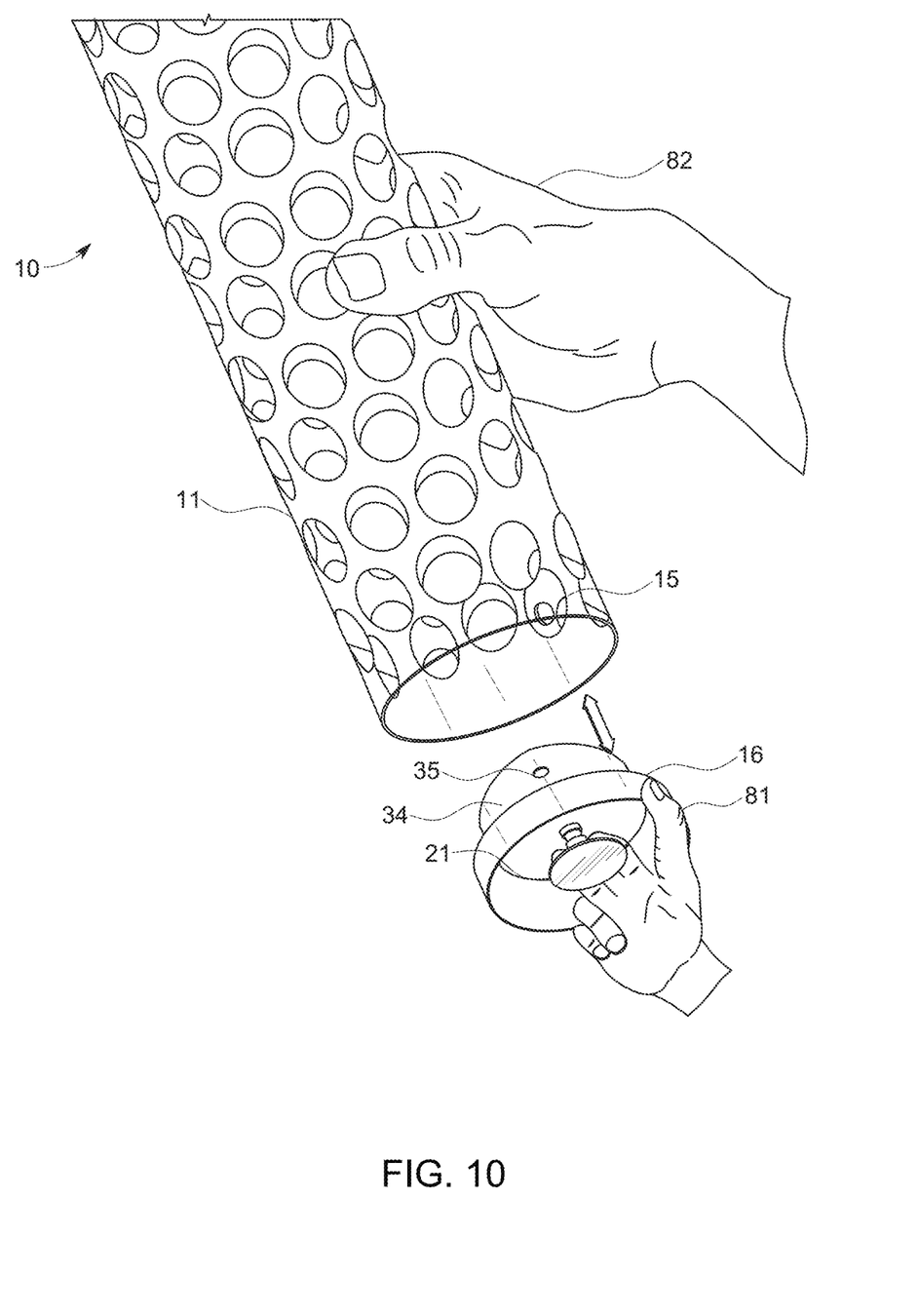
FIG. 10 is a perspective view of the base member being attached to the enclosure of the bird feeder.
Figure 11:
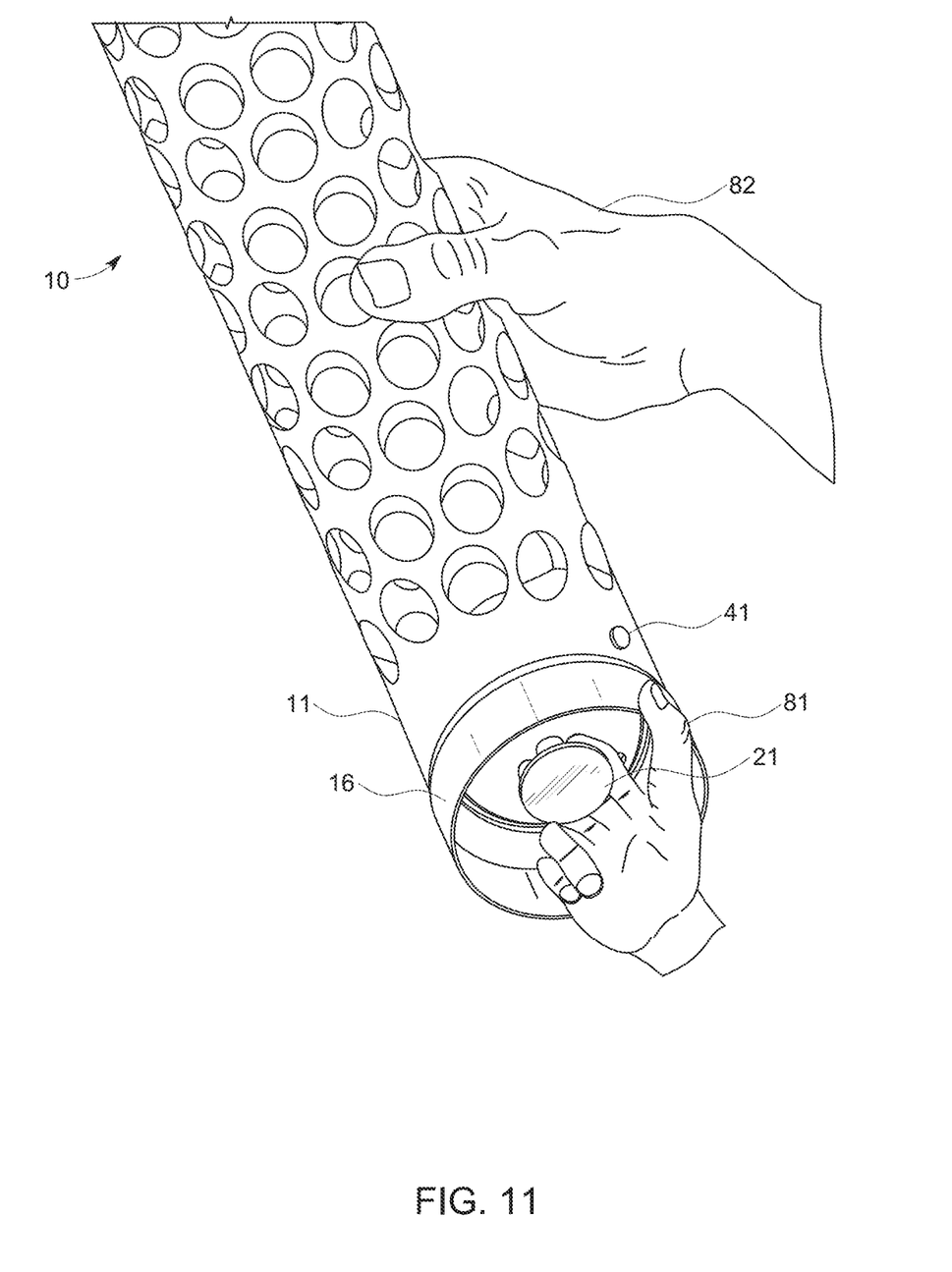
FIG. 11 is a perspective view of the base member having been attached to the enclosure of the bird feeder.

In FIGS. 10 and 11, the procedure for the attachment of base member to the enclosure of the bird feeder of the preferred embodiment of the present invention is shown. As seen in FIG. 10, the operator pulls knob vertically downwards and retains in that position with one hand (81). The downward pulling of the knob results in moving the locking pins (41) (not shown in FIG. 10) inwardly through the lock aperture (35) of the base member (16). With the other hand (82), the operator moves the enclosure (11) over the base member (16) aligning the bottom end of the enclosure (11) with the neck portion (34) of the base member (16). The operator then places the enclosure (11) over the neck portion (34) of the body member (16) until it rests against the annular seat (33) (not shown in FIG. 10 and FIG. 11). The operator then releases the pull knob (21). If not already aligned, the operator then twists the enclosure (11) (or base member (16)) to align the locking pins (41) with lock aperture (15) on the enclosure (11) to secure the base member (16) to the enclosure (11). As the pull knob (21) is released, the locking pins (41) retract outwardly through the lock apertures (35) of the base member (16) and the corresponding lock apertures (15) of the enclosure (11).

The process of disengagement of the base member (16) from the enclosure (11) is reversed wherein the operator pulls down the knob vertically downwards. As the pull knob (21) is pulled vertically downwards, locking pins (41) retract horizontally in the inward direction through the lock aperture (15) of the enclosure (11) as well as through the lock aperture (35) of the base member causing the separation of the base member (16) from the enclosure (11) of the bird feeder (10). Thus, access to the interior of the enclosure (11) and the base member (16) can be achieved for easy cleaning thereof.

The foregoing description of the present invention will so fully reveal the general nature of the embodiments/aspects herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

I claim:

1. A bird feeder with a pull knob device for removing a base, comprising:
    an enclosure having a top and bottom opening and a side wall, said enclosure comprising a plurality of holes providing access to birds to a bird feed contained inside the enclosure;
    a top cover securing the top opening of the enclosure;
    a plurality of locking apertures near a bottom end the side wall of the enclosure; and
    a base member enclosing the bottom opening of the enclosure,
    wherein the base member has a pull knob device fixed inside the base member,
    wherein the base member comprises a plurality of locking apertures near the top of the base member, and
    wherein the pull knob device comprises,
        a metallic housing having locking pins passing through a cylindrical passage attached on sides of the housing,
        a pull knob attached to a taper slider through a vertical pin,
        a plurality of first compressive springs for locking pins forming spring-biased locking pins to bias the locking pins outwardly, wherein the spring-biased locking pins passing through the locking apertures of the base member are configured and arranged to engage one of the plurality of locking apertures on the enclosure to releasably secure the base member to the bottom opening of the enclosure, and
        a second compressive spring for the taper slider biasing the pull knob in a release position, wherein the locking pins engages the taper slider and are configured to retract inwardly as the pull knob is pulled vertically downwards by a user to disengage the spring-biased locking pins from the locking aperture of the enclosure.

2. The bird feeder as claimed in claim 1, wherein the enclosure and the base member are comprised of two locking apertures.

3. The bird feeder as claimed in claim 1, wherein the pull knob device comprises two locking pins extending from the pull knob device.

4. The bird feeder as claimed in claim 1, wherein the pull knob comprises two first compressive springs for the locking pins forming spring-biased locking pins.

5. The bird feeder as claimed in claim 1, wherein in a normal release position, the locking pins are configured to be retracted outward due to compression in the first compressive springs resulting from the engagement of the locking pins with the taper slider.

6. The bird feeder as claimed in claim 1, wherein the locking pins are configured to be retracted inward due to tension in the first compressive springs resulting from the engagement of the locking pins with the taper slider.

* * * * *